United States Patent [19]

Honeycutt, Jr. et al.

[11] Patent Number: 4,478,551
[45] Date of Patent: Oct. 23, 1984

[54] TURBINE EXHAUST CASE DESIGN

[75] Inventors: Fred L. Honeycutt, Jr., Lake Park; Erik A. Lindstrom, Palm Beach Gardens, both of Fla.

[73] Assignee: United Technologies Corporation, Hartford, Conn.

[21] Appl. No.: 328,565

[22] Filed: Dec. 8, 1981

[51] Int. Cl.³ .............................................. F01D 9/02
[52] U.S. Cl. ..................................... 415/142; 415/139
[58] Field of Search ............... 415/136, 137, 139, 142; 60/39.5, 39.32, 271

[56] References Cited

U.S. PATENT DOCUMENTS

| | | | |
|---|---|---|---|
| 2,938,336 | 5/1960 | Peterson | 60/39.5 |
| 3,028,141 | 4/1962 | Nichols | 415/137 |
| 4,274,805 | 6/1981 | Holmes | 415/139 X |
| 4,304,522 | 12/1981 | Newland | 415/142 X |
| 4,384,822 | 5/1983 | Schweikl et al. | 415/138 X |

Primary Examiner—Everette A. Powell, Jr.
Attorney, Agent, or Firm—Stephen E. Revis

[57] ABSTRACT

According to a preferred embodiment of the present invention, a stage of turbine exhaust exit guide vanes is supported at their outer ends by attachment to the outer turbine exhaust case in a manner permitting upstream and downstream rocking of the vanes, while the inner vane ends engage the upstream end of a sheet metal fairing which defines the radially inner surface of the exhaust gas flow path. The fairing is cantilever supported at its downstream end and is spaced radially outwardly from the inner turbine exhaust case. The inner vane ends are free to move radially relative to the fairing which provides only axial support therefor. Hollow struts disposed immediately downstream of the guide vanes extend between the inner and outer exhaust cases and pass through openings in the fairing which is preferably corrugated in the axial direction to reduce vibration.

5 Claims, 3 Drawing Figures

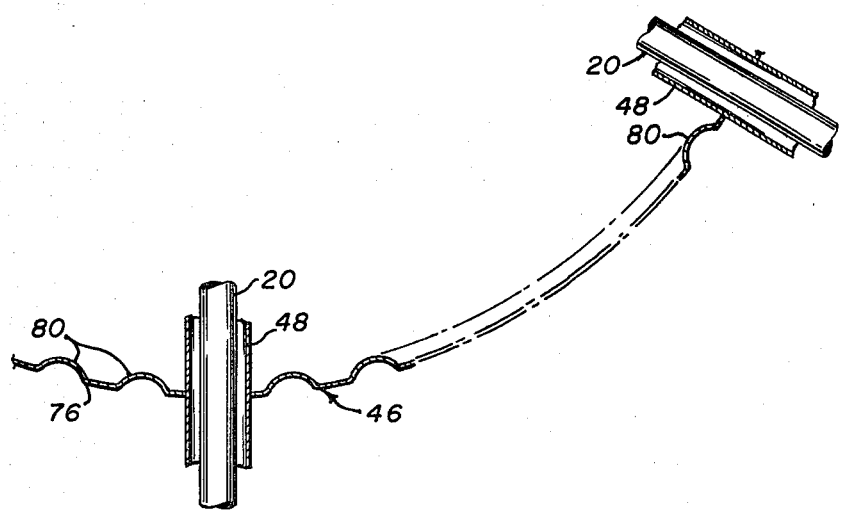
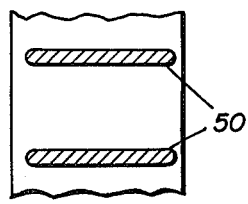
FIG. 2
FIG. 3

TURBINE EXHAUST CASE DESIGN

DESCRIPTION

1. Technical Field

This invention relates to axial flow gas turbine engines and, more particularly, to the support of turbine exit guide vanes.

2. Background Art

It is known in the gas turbine engine art to cantilever support turbine exit guide vanes by suitable rigid attachment of their outer ends to the outer turbine exhaust case. All axial, radial, and torsional vane loads are thereby transmitted into the outer exhaust case at the point of attachment of the vanes.

Pratt & Whitney Aircraft Group's F100 axial flow gas turbine engine has a turbine exhaust case assembly comprising inner and outer exhaust cases spaced apart by a plurality of radially extending hollow struts fixedly attached at both their inner and outer ends to said inner and outer exhaust cases, respectively. The outer exhaust case defines the radially outer surface of the engine gas flow path downstream of the last stage of turbine blades. The radially inner surface of the gas flow path is formed by a sheet metal, non-structural fairing spaced radially between the inner and outer cases and through which the struts pass, and which is cantilever supported at its rearward end from the inner case. The inner case is attached at its forward end to bearing support structure for the engine rotor shaft; and tie rods connected to the bearing support structure pass radially outwardly through the struts to an engine mount ring surrounding the outer case to transmit loads from the bearing support structure to the mount ring. In this F100 engine the sheet metal fairing only defines the inner flow path wall and acts as a heat shield to the inner case means and bearing support structure. There are no turbine exhaust guide vanes between the last turbine stage and the hollow struts.

DISCLOSURE OF INVENTION

One object of the present invention is a turbine exhaust case assembly with improved means for supporting a stage of turbine exit guide vanes.

According to one aspect of the present invention, a sheet metal fairing defines the inner wall of a turbine exhaust gas flow path and is cantilever supported from its rearward end from a radially inwardly spaced turbine case which is connected to a radially outwardly spaced turbine case by a plurality of hollow, radially extending struts which pass through the fairing, wherein a stage of turbine exit guide vanes disposed immediately upstream of the struts extend across the gas flow path and have inner ends which are axially supported by the upstream end of the fairing and outer ends which are attached to the outer turbine exhaust case.

According to a preferred embodiment of the present invention, the outer ends of the vanes are pivotally mounted to the outer exhaust case to permit a small amount of rocking of the vanes in the upstream and downstream direction about the attachment point; and the inner ends of the vanes engage the gas path fairing in a manner permitting both radial and some axial movement of the inner ends of the vanes relative to the fairing.

This construction permits considerable distortion of the outer turbine exhaust case relative to the inner turbine exhaust case without inducing radial loads or excessive torsional loads in the sheet metal fairing, which is not a very strong structural member and would not normally be considered suitable as a vane support. Permitting the vanes to rock or pivot about their outer attachment points reduces the moments which would otherwise be transmitted from the outer case to the vanes and result in excessive axial motion at the inner ends of the vanes. Excessive axial motion at the inner ends of the vanes could result in interference between the vanes and those parts of the engine immediately upstream and downstream thereof, or, in the alternative, would require the fairing to be able to withstand much greater axial loads to prevent such movement.

The foregoing and other objects, features and advantages of the present invention will become more apparent in the light of the following detailed description of the preferred embodiments thereof as shown in the accompanying drawing.

BRIEF DESCRIPTION OF THE DRAWING

FIG. 2 is a cross-sectional view taken along the line 2—2 of FIG. 1.

FIG. 3 is a cross-sectional view taken along the line 3—3 of FIG. 1.

BEST MODE FOR CARRYING OUT THE INVENTION

Figure 1:
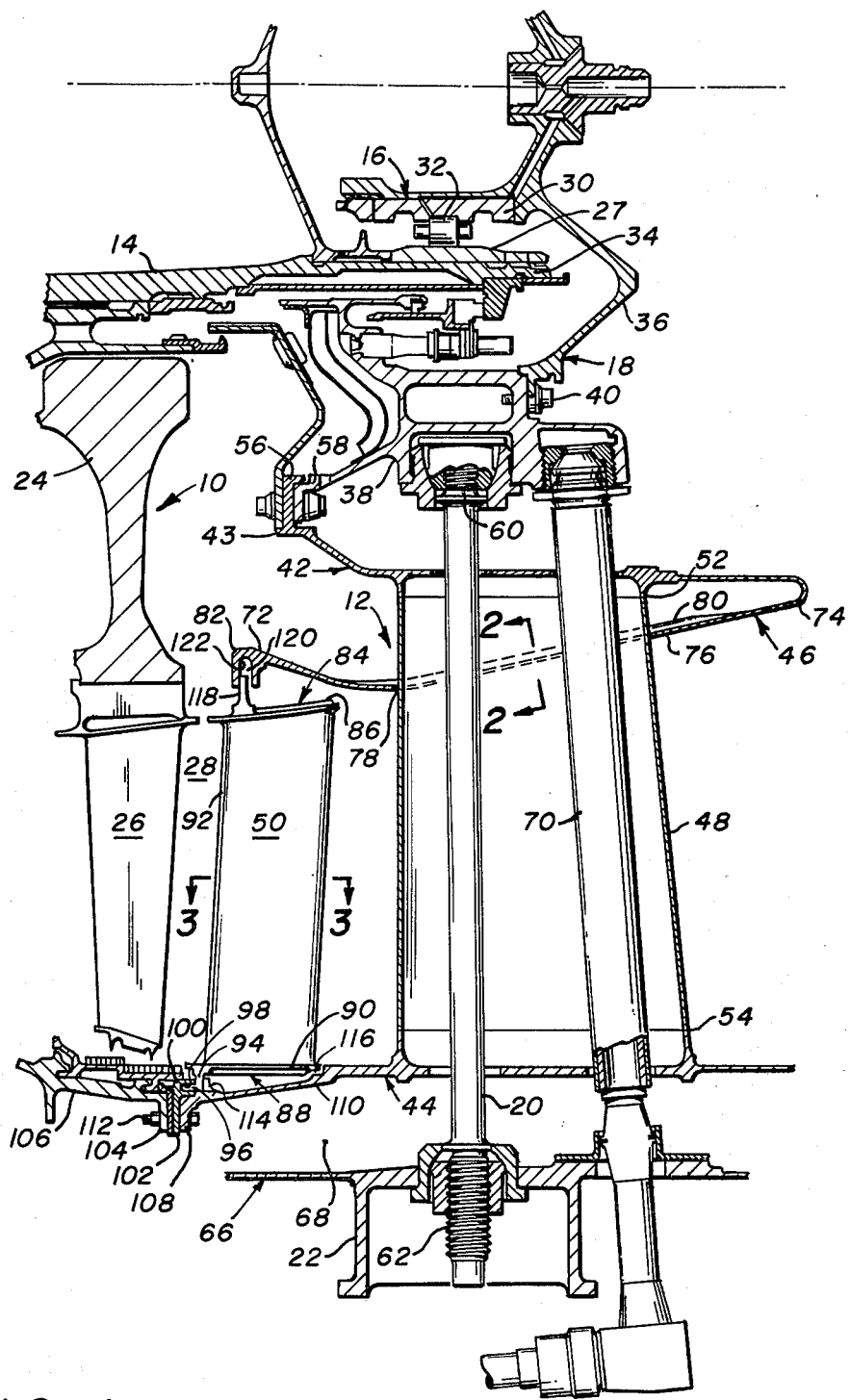
FIG. 1 is a cross-sectional elevation view of the turbine exhaust portion of an axial flow gas turbine engine constructed in accordance with the teachings of the present invention.

Referring to FIG. 1, the turbine and turbine exhaust section of an axial flow gas turbine engine is shown in cross section. The portion shown comprises a turbine rotor assembly 10, a turbine exhaust case assembly 12, a rotor shaft 14, a rear bearing 16, bearing support structure 18, tie rods 20, and engine mount structure 22.

The rotor assembly 10 is supported from the shaft 14 by means which are not shown but which are well known to those skilled in the art and which do not form a part of the present invention. The rotor assembly 10 includes a hub portion 24 having a plurality of turbine blades 26 extending radially outwardly therefrom across the gas flow path 28.

The bearing 16 comprises a rotating outer race 27 and a stationary inner race 30 separated by circumferentially disposed roller elements 32. The outer race 27 is secured to the rearward end 34 of the shaft 14 and rotates therewith. The stationary inner bearing race 30 is secured by suitable means to the bearing support structure 18 which comprises a plurality of annular structural members such as the "W" shaped support 36 and the shaft seal support 38, which are secured together by bolts 40. The construction of the bearing 16 and bearing support structure 18 are not critical to the present invention.

The turbine exhaust case assembly 12 comprises an inner case 42, an outer case 44, an annular fairing 46, a plurality of radially extending hollow struts 48, and a stage of turbine exit guide vanes 50. In this embodiment there are six struts equally spaced circumferentially about the engine axis and fixedly attached at both their inner ends 52 and outer ends 54 to the inner and outer cases 42, 44, respectively. The upstream end 43 of the inner case 42 includes a radially inwardly extending flange 56 which is bolted to a corresponding outwardly extending flange 58 which is a part of the shaft seal support 38. It can thus be seen that the turbine exhaust case assembly 12 is hung or supported from the bearing support assembly 18.

The tie rods 20 have inner threaded ends 60 fixedly attached to the bearing support assembly 18 and outer threaded ends 62 fixedly attached to the engine mount structure 22. Each tie rod passes through one of the struts 48 and carries the loads from the bearing support assembly 18 to the engine mount structure 22. In this embodiment the engine mount structure 22 is a part of a fan bypass duct assembly 66 which defines an annular fan bypass flow path 68 between itself and the outer case 44. Although unrelated to the present invention, a bearing oil feed tube 70 is also shown passing through a strut 48.

The fairing 46 has an upstream end 72, a downstream end 74, and a sheet metal wall 76 extending therebetween. The wall 76 and the outer case 44 define the gas flow path 28 downstream of the turbine exit guide vanes 50. As shown in the drawing, the downstream end 74 of the fairing 46 is cantilever supported from the inner case 42 downstream of the struts 48. The wall 76 has holes 78 therethrough the shape of the struts 48 and through which the struts pass. As best shown in FIG. 2, the wall 76 includes axial corrugations 80 therein along the axial length of the struts 48. The corrugations are mainly for the purpose of reducing vibrations in the fairing 46 during engine operation. The upstream end 72 of the fairing 46 includes a support ring 82 having a substantial cross-sectional area for providing stiffness to the thin, sheet metal wall 76.

As best shown in FIG. 3 the exit guide vanes 50 in this embodiment are virtually flat plates (i.e., nonairfoil shaped) for the purpose of straightening the flow of gases exiting from between the turbine blades 26. Due to the fact that in this embodiment there is virtually no pressure drop across the vanes 50, and because the surface area of the vanes acted on by the down-stream pressure is greater than the surface areas acted on by the upstream pressure, the vanes are constantly pressure loaded in the upstream direction during engine operation. The vanes 50 include radially inner ends 84 including inner platforms 86, and radially outer ends 88 including outer platforms 90. The vanes 50 are attached to the outer case 44 at their outer ends 88 near their forward edges 92. The platforms 90 include outwardly extending and circumferentially abutting flange portion 94 having forwardly extending lips 96. These lips fit within a rearwardly facing annular slot 98 in a vane support ring 100. The ring has a radially outwardly extending annular plate portion 102 trapped between a radially outwardly extending flange 104 of a forward outer case portion 106 and a radially outwardly extending flange 108 of a rear outer case portion 110. The flanges 104, 108 are secured together by bolts 112. Radially inwardly extending circumferentially spaced apart annular lip segments 114 on the rear outer case portion 110 just down-stream of each flange portion 94 prevent axial movement of the outer ends of the vanes 50. This hook-type arrangement at the upstream ends of the platforms 90, coupled with a small radial gap 116 between the downstream ends of the platforms 90 and the outer case 44, permits a significant amount of rocking of the vanes 50 in an upstream and downstream direction about their point of attachment to the outer case 44. The vanes 50 may be individual vanes, each with their own platforms 86, 90; or they may be clusters of two or more vanes which share common platforms.

The upstream ends of the inner platforms 86 of the vanes 50 include inwardly extending and circumferentially abutting tangs 118 which, taken together, form an annular segmented ring. These tangs fit within an annular radially outwardly facing channel 120 formed in the support ring 82 of the fairing 46 and are free to move radially relative thereto. During engine operation the vanes 50 are pressure loaded in the upstream direction such that the tangs 118 are forced against the rearwardly facing surface 122 of the channel 120. The axial width of the channel 120 is wider than the thickness of the tangs 118 such that the vanes can rock in the upstream and downstream direction without the possibility of putting any twisting moments into the fairing 46.

In addition to providing a lightweight, structurally sound turbine exit vane support system, the turbine exhaust case assembly of the present invention provides a good heat shield for the bearing 16 and bearing support structure 18 in that the only leakage path for the hot gas stream is through gaps between the fairing wall 76 and the struts 48, and gaps between adjacent tangs 118.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In an axial flow gas turbine engine including a turbine section comprising at least one turbine rotor stage, a turbine exhaust case assembly disposed downstream from said rotor stage and including means defining an axially extending annular gas flow path, the exhaust case assembly comprising:

inner case means;

outer case means spaced radially outwardly from said inner case means;

a stage of turbine exit guide vanes disposed in said gas flow path for straightening the flow of gases exiting said turbine rotor stage, said guide vanes having radially outer ends attached to said outer case means in a manner permitting rocking of said vanes in an upstream and downstream direction about the point at which they are attached to said outer case means;

a plurality of circumferentially disposed struts extending radially across the flow path downstream of said guide vanes and having inner ends fixedly attached to said inner case means and outer ends fixedly attached to said outer case means; and fairing means having an upstream end and downstream end, said fairing means including sheet metal wall means having an upstream end, said wall means being disposed between said inner case means and outer case means defining the radially inner surface of said annular gas flow path immediately downstream of said exit guide vanes, said fairing means being cantilever supported from its downstream end from said inner case means downstream of said struts, each of said struts passing through an opening in said wall means, said upstream end of said fairing means engaging said inner ends of said exit guide vanes to provide axial support for said guide vanes, said fairing means comprising a support ring integral with said upstream end of said sheet metal wall means, said support ring providing stiffness to said wall means and having an annular outwardly facing channel disposed therein, said inner ends of said exit guide vanes including tangs extending radially inwardly into said channel, the width of said channel in the axial direction being wider than the thickness of said tangs in the axial direction, permitting axial movement of the inner ends of said vanes, said inner ends of said exit guide vanes being free to move radially relative to said fairing means.

2. The turbine exhaust case assembly according to claim 1 wherein said vanes each have a forward and rearward edge and are attached to said outer case means adjacent their forward edges.

3. The turbine exhaust case assembly according to claims 1 or 2 wherein said wall means includes axial corrugations between said struts.

4. The turbine exhaust assembly according to claim 1 wherein said tangs are circumferentially extending and abut one another to define a segmented annular ring.

5. The turbine exhaust case assembly according to claim 1 wherein said engine includes engine mount ring means disposed radially outwardly of said outer case means, an axially extending rotor shaft, bearing means disposed on said shaft, and bearing support structure secured to said bearing means and located radially inwardly of said inner case means, said inner case means being attached to and supported by said bearing support structure and said outer case means being supported by said inner case means through said struts, a plurality of substantially radially extending tie rods each passing through one of said struts, each tie rod having an inner end attached to said bearing support structure and an outer end attached to said mount ring means to transmit loads from said support structure to said mount ring means.

* * * * *